June 21, 1966 J. W. WARBURTON II 3,256,852
HYDRO DRIVE

Filed April 13, 1964 7 Sheets-Sheet 1

JOHN W. WARBURTON II
*INVENTOR.*

BY *Seed & Berry*

ATTORNEYS

June 21, 1966  J. W. WARBURTON II  3,256,852
HYDRO DRIVE

Filed April 13, 1964  7 Sheets-Sheet 2

FIG—3

JOHN W. WARBURTON II
INVENTOR.

BY *Seed & Berry*

ATTORNEYS

FIG. 4

JOHN W. WARBURTON II
INVENTOR.

BY Seed & Berry

ATTORNEYS

June 21, 1966 J. W. WARBURTON II 3,256,852
HYDRO DRIVE
Filed April 13, 1964 7 Sheets-Sheet 4

FIG__5

FIG__6

JOHN W. WARBURTON II
INVENTOR.

BY *Seed & Berry*

ATTORNEYS

June 21, 1966  J. W. WARBURTON II  3,256,852
HYDRO DRIVE
Filed April 13, 1964  7 Sheets-Sheet 5

JOHN W. WARBURTON II
INVENTOR.

BY Seed & Berry
ATTORNEYS

June 21, 1966 J. W. WARBURTON II 3,256,852
HYDRO DRIVE
Filed April 13, 1964 7 Sheets-Sheet 6

JOHN W. WARBURTON II
INVENTOR.

BY Seed & Berry

ATTORNEYS

June 21, 1966  J. W. WARBURTON II  3,256,852
HYDRO DRIVE

Filed April 13, 1964  7 Sheets-Sheet 7

FIG__16

FIG__17

FIG__18

JOHN W. WARBURTON II
INVENTOR.

BY *Seed & Berry*

ATTORNEYS

United States Patent Office 3,256,852
Patented June 21, 1966

3,256,852
HYDRO DRIVE
John W. Warburton II, Kirkland, Wash., assignor to Hydro Drive Corporation, Seattle, Wash., a corporation of Washington
Filed Apr. 13, 1964, Ser. No. 359,107
14 Claims. (Cl. 115—35)

The present invention relates to outdrive propulsion for inboard boats, and particularly to marine outdrives of the through-transom type in which a drive shaft for an inboard engine passes rearwardly through the transom to an outboard power leg having a steerable propeller and provision for tilt-up. This application is a continuation-in-part of my copending application Ser. No. 274,662, filed April 22, 1963.

An important object of the invention is to provide an outdrive having a self-contained hydraulic system making provision for hydraulic clutching in both forward and reverse drives, automatic hold-down of the outdrive when it is shifted into reverse, absorption of shock from tilt-up and tilt-down of the outdrive when in a forward drive condition, and selective hydraulic tilt-up of the outdrive and hydraulic lock-in after tilt-up.

The invention further aims to provide an outdrive which can be easily installed and demounted, and which permits a wide choice in the location of the associated inboard engine.

Another object is to provide such an outdrive which maintains direct thrust and assures smooth, positive and effortless steering in either turning direction.

Still a further object is to provide an outdrive which may be tilted on its transom mounting without disengaging power or uncoupling shift and steering controls, and which may be partially retracted for shallow water propulsion.

Other objects and advantages in view will appear and be understood in the following description and claims, the invention consisting in the novel construction and the adaptation and combiation of parts hereinafter described in the claims.

Referring to the drawings, it is seen that the outdrive of the present invention has a power leg 9 pivoted for tilt-up on pins 13—13 passing laterally through forwardly projecting ears 14 on the power leg and rearwardly extending lugs 15 on a mounting plate 16. This plate is in turn secured together with a back-up plate 17 on the transom 18 of the related boat hull by bolts 19. The power leg comprises upper and lower housings 11–12, with the upper housing being stationary steeringwise while the lower housing steers by turning of an upright hollow post 20 in the bore 21a of an elongated boss comprising a transverse vertical cross-web 21 which continues downwardly from a central horizontal cross-wall 22 in the upper housing. This cross-wall is the floor of an oil sump 23 for a Tuthill self-reversing pump 24 which provides pressure fluid for operating a hydraulic cylinder unit 10 which extends between the upper housing 11 and the mounting plate 16, and for operating forward and reverse hydraulic disc-type clutches 25–26 on the drive shaft 27 for the propeller 28. Power from a drive shaft 30 driven by an inboard engine (not shown) to the clutched propeller shaft 27 is transferred via a coupling 31, input shaft 32, upper bevel gears 33–34, vertical shaft 35, lower pinion 36, and forward and reverse bevel gears 37–38, respectively. It will be noted that the input shaft 32 drives the oil pump 24 as well as the upper pinion 33, and that the oil pump is mounted in a block 39 secured by screws 39a at the rear of the sump 23. The controls for the hydraulic system are contained in a control block 40 which is mounted on the underside of the cover 11a of the upper housing.

Returning with more particularity to the upper housing 11, the front wall 41 of the oil reservoir 23 is formed with an inner boss 41a which is bored and counterbored to receive a ball bearing unit 42 and a retainer 43 bolted at 44. The inner race of the bearing 42 is sleeved on the hub 33a of the pinion 33 and bears at the front against a spacer 45 in turn shouldering against a step at the head of the input shaft 32. A nut 46 on the latter holds the pinion 33 in position. At its rear end the shaft 32 is necked for a bearing 47 housed in the block 39 and has a center bore to receive the input shaft 48 of the pump 24. This pump shaft 48 is locked to the shaft 32 as by a set screw 50.

In housing 11 spaced above the cross-wall 22 is a cross-web 51 which is vertically bored to receive a ball bearing unit 52 for the hub 34a of the gear 34. Cross-wall 22 is in turn formed with a seat for a bearing 53 on the necked head 20a of the steering post 20. Keyed to this neck 20a above the bearing 53 is a steering gear 54 which is retained by a snap ring 59 and is driven by a worm 55 at the port side thereof. The shaft 56 for this worm 55 projects through the front wall 41 of the upper housing to receive a lower sprocket 61 and is journaled in fore and aft bearings 57–58 seated, respectively, in the front wall 41 and in a vertical web 60. This web is located on the port side of the sump 23 and extends between the cross-web 51 and the cross-wall 22. Driving the sprocket 61 is an endless chain 62 which is in turn driven by an upper sprocket 63 mounted on a stub shaft 64. The latter is suitably journaled in the boss 41a and is retained by a snap ring 64a at the rear.

Mounted on the forward end of the stub shaft 64 is one of the components of a steering coupling 65 of the same type as the drive coupling 31. The other coupling component is fixed to the aft end of a rotary steering shaft 66 which projects forwardly through registering openings in the mounting plate 16, the transom 18, and an outrigger 70 to receive its drive from a pinion 67. This pinion is operated by a rack 68 which is slidably received in the outrigger and is connected as by a cable 69 to steering controls remote thereto in any suitable manner well known in the art.

It will be noted that the outrigger 70 has a central cover portion 70a for the free end of a boss extension 72 of the mounting plate 16. Bolts 71 hold the outrigger in position. The boss 72 projects forwardly through an opening 18a in the transom and its principal function is to house a pair of ball bearing units 73–74 for the drive shaft 30 which are protected by seals 75. A sleeve 76 serves as a spacer between the inner races of these bearings 73–74 while the outer race of the aft bearing 73 shoulders at the rear of the boss 72 and the forward bearing 74 is retained by shouldering the cover 70a thereagainst.

At its lower end the vertical cross-web 21 is enlarged fore and aft and is counterbored to receive a second bearing 77 for the steering post 20 and a bottom seal 77a. Commencing at the bearing 77 the wall of the steering post 20 thickens and then presents a circumferential anchoring flange 20a which is secured by countersunk screws 78 to the head of a cross-web 80 in the lower housing 12. This cross-web is centrally vertically bored to receive a continuation of the steering post below the flange 20a and to house thrust bearings 81–81a for the lower end of the drive shaft 35 and to house a needle bearing unit 82 for the hub 36a of the bevel gear 36. This gear 36 is held in position by a nut 79 threaded onto the lower end of the shaft 35 and opposes a downwardly facing shoulder 35a formed on the shaft to provide a seat for the inner race of the thrust bearing 81.

Forward of the cross-web 80 the lower housing 12 has a front cavity 83 which is closed at the top by a wall 83a and merges at its lower end with a bottom cavity 84 which receives the propeller shaft 27 and related clutches, gears and bearings. The lower housing 12 is of three-piece construction comprising an upper part 12a open at the bottom to provide the upper half of the cavity 84, a rudder 12b secured to the upper part as by screws 85 and providing the lower half of the cavity 84, and a hub cap 12c for the aft end of the propeller shaft 27 which is secured to both the upper piece 12a and rudder 12b by screws 86. Behind the cross-web 80 the upper part 12a has a rear cavity or well 87 which is open at the top and is separated at the bottom from the cavity 84 by a wall 87a. The upper part 12a also provides a rearwardly projecting cavitation plate 12d.

Figure 4:
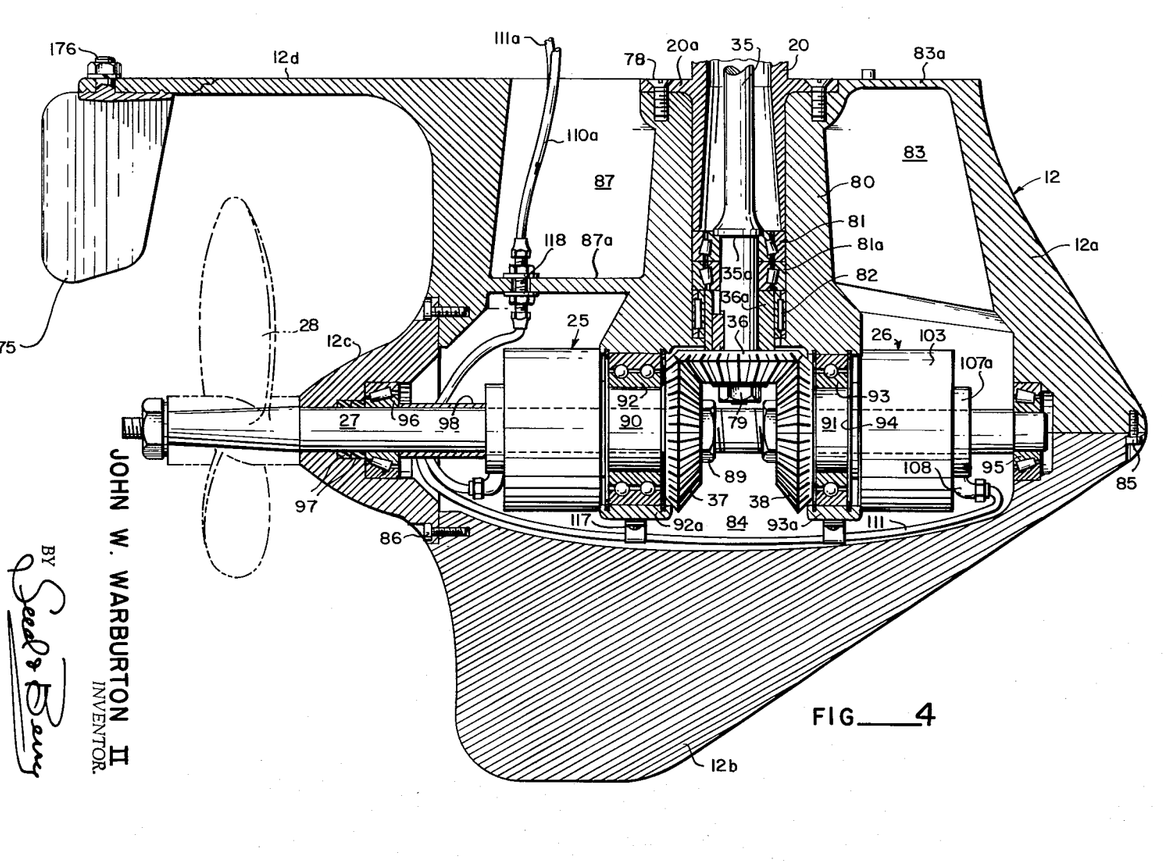
FIG. 4 is a longitudinal vertical sectional view of the lower part of the outdrive taken as in FIG. 3.

It will be noted (FIG. 4) that the forward and reverse gears 37–38 are keyed at 88 to respective elongated hubs 90–91 freely sleeved on the propeller shaft 27, and that respective nuts 89 retain the gears. As journals for the hubs 90–91 there is provided ball bearing units 92–93 housed in bearing caps 92a–93a which may be cast integral with the foot of the web 80. Snap rings 94 retain the bearings 92–93 within their caps. The propeller shaft is in turn provided with front and rear thrust bearings 95–96, the first fitting is a seat formed at the front of the cavity 84, and the other being housed in the cap 12c and being provided with seals 97.

The clutches 25–26 are identical and so like identifying numerals will be applied to the respective parts thereof. Referring to FIGS. 11–14, each clutch has a hub 100 which is internally splined on the propeller shaft 27 and is externally splined to interfit with the internal splines of a set of driven annular friction plates 101. The latter are alternated with a set of mating driving plates 102 which are free to turn on the clutch hub 100 but have radially projecting spline lugs 102a which interfit with spline grooves 103a in the inner face of a tubular clutch housing 103. At its inner end this clutch housing interfits by its spline grooves with splines 109 on the outer end of the related gear hub 90 or 91 and by an inturned lip 103b behind these splines. The outer end of the clutch housing 103 is closed by a retainer 104 which is held against endwise movement by a snap-ring 105. This retainer is formed at its inner end with an annular piston chamber 106, facing toward the clutch plates 101–102, and is sleeved on a slip ring 107 in turn journaled on the propeller shaft 27. The outer end of the slip ring has an enlarged head 107a and is held in position by a spacing sleeve 98 which seats at its opposite end against the inner race of the bearing 96. An elbow fitting 108 is mounted in a radial bore 107b in the head 107a of the slip ring to receive a hydraulic line 110 or 111 and communicates with the chamber 106 via an axial passage 107c and circumferential groove 107d in the slip ring and a radial port 107e in the retainer 104. A pair of O rings 112 provide a seal for the groove 107d.

Figure 11:
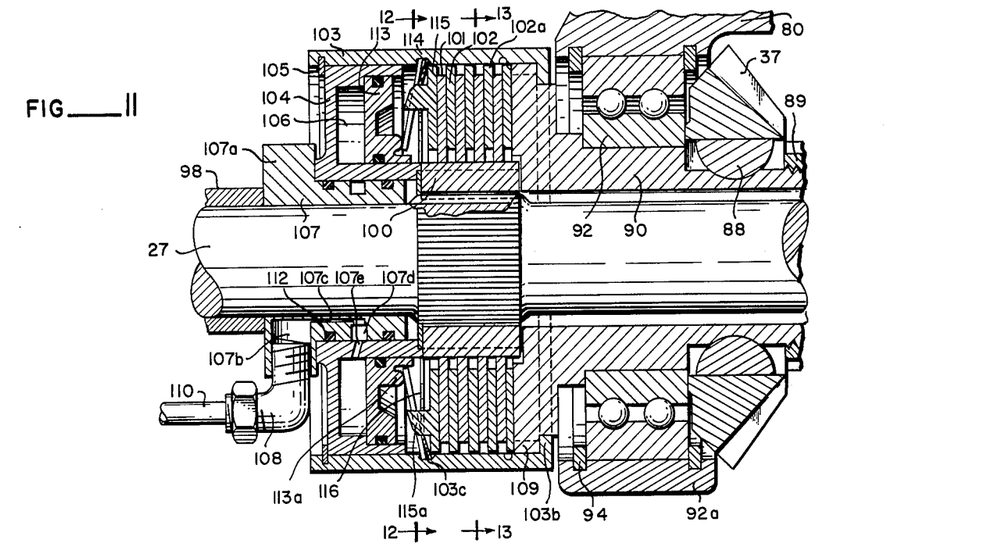
FIG. 11 is an enlarged longitudinal vertical sectional view of the forward clutch assembly.
Figure 12:
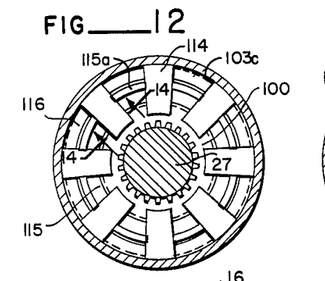
FIGS. 12 and 13 are transverse vertical sectional views taken on the lines 12—12 and 13—13, respectively, of FIG. 11.
Figure 13:
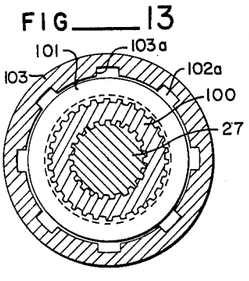
Figure 14:
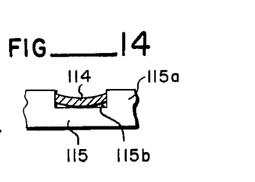
FIG. 14 is a detail sectional view taken as indicated by the line 14—14 of FIG. 12.
Figure 15:
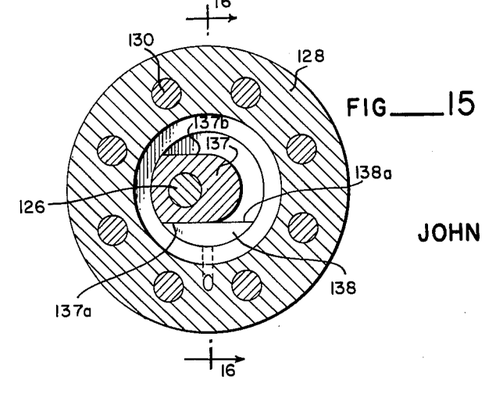
FIG. 15 is a detail transverse sectional view taken as indicated by the line 15—15 of FIG. 3.
Figure 16:
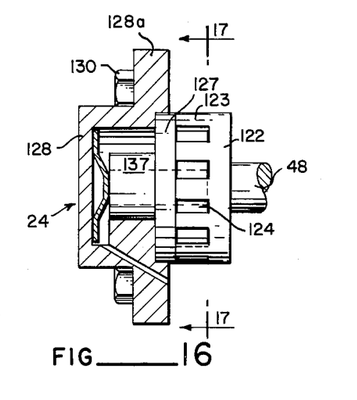
FIG. 16 is a fragmentary sectional view taken as indicated by the line 16—16 of FIG. 15.
Figure 17:
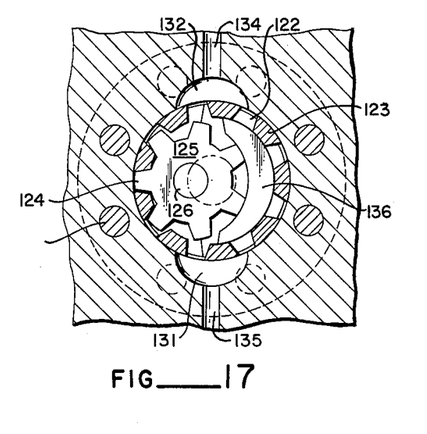
FIG. 17 is a detail vertical sectional view taken as indicated by the line 17—17 of FIG. 16.

Working in the chamber 106 is a ring-like piston 113 which is formed with an inner pressure lip 113a projecting toward the clutch hub 100. The free end of this lip bears against the inner end of a set of radially extending levers 114 which have their outer fulcrum ends seated in an annular groove 103c formed in the inside wall of the clutch housing 103. At about one-third of the distance from their outer fulcrum ends to their inner piston-engaged ends, the levers 114 bear against a pressure plate 115 which in turn bears against the clutch plates 101–102. To keep the levers 114 in regular circumferentially spaced relation the pressure plate 115 has an intermediate annular lip 115a which is directed toward the piston 113 radially outward of its pressure lip 113a and has a respective radial groove 115b to receive each of the levers 114. A Belleville washer 116 acts against the levers 114 in opposition to the piston 113 to serve as a return spring. With the described arrangement fluid pressure applied to the outer face of the piston 113 forces the pressure lip 113a thereof against the inner ends of the levers 114 and this force is multiplied by the levers as a force against the lip 115a of the pressure plate 115. This multiplied force is in turn applied by the pressure plate to the clutch plates 101–102 thereby coupling the propeller shaft 27 to the respective forward or reverse gear hub 90 or 91.

Pressure fluid is selectively fed to and discharged from the forward and reverse clutches through the tubes 110–111. The tube 111 continues rearwardly from the slip ring of the reverse clutch 26 along the base of the cavity 84 through guides 117 screwed to the underside of the bearing caps 92a–93a, and then bends upwardly alongside the tube 110 from the forward clutch 25. These tubes 110–111 then continue via respective through-fittings 118 in the wall 87a to flexible hose extensions 110a–111a which pass upwardly through the well 87 into the upper housing cavity 119 lying behind the vertical cross-web 21 and beneath the central horizontal wall 22. Similarly, at the head of the cavity 119 the flexible extensions 110a–111a continue by respective fittings 120 through the wall 22 to extensions 110b–111b in the sump 23 and make connection with respective ports in the control block 40. It is important to understand that the hose extensions 110a–111a are flexible and have enough slack to permit the lower housing 12 to be steered without restriction relative to the upper housing 11.

The oil pump 24 is preferably self-reversing so that the same power leg can be used without modification of the drive mechanism therein for either direction of rotation of the engine output shaft 30. In the illustrated embodiment, the input shaft 48 of the pump has a front rotor 122 with rearwardly projecting teeth 123 evenly spaced around the periphery thereof. These teeth 123 mesh with part of the teeth 124 of an eccentrically mounted idler gear 125 which rotates on a stud 126 projecting forwardly off-center of a circular back plate 127. The latter is journaled in an outwardly dished rear cap 128 having an annular mounting flange 128a bolted at 130 to the back of the block 39. In this regard, the block is bored and counterbored at the rear to receive and match the rotor 122 and mounting flange 128a, and the bore is enlarged at 131 and 132 to provide inlet and outlet ports, respectively. An inlet passage 133 from the bottom of the block 39 leads from the sump 23 to the inlet port 131 while the outlet port 132 is intersected by a vertical passage 134 to feed the control block 40 via a tube 135.

Directing attention to the back plate 127, at the front it presents a forwardly projecting crescent-shaped partition 136 disposed between the rotor teeth 123 and the idler 125 through part of the travel thereof, and namely, that part which is diametrically opposite the location of intermesh between the rotor and the idler teeth 123–124. At the rear the back plate 127 presents a rearwardly projecting stop 137 having parallel stop faces 137a–b arranged to engage the chordal face 138a of a segmental shaped cross-wall 138 in the cap 128 upon rotation of the back plate. When the pump shaft 48 is turning clockwise when viewed from the rear of the power leg, the stop face 137a engages the chordal face 138a and locates the crescent partition 136 as shown in the drawing. If the engine rotation were reversed the frictional drag of the idler 125 on the back plate 127 would cause it to turn counter-clockwise until the stop face 137b engaged the face 138a and thereby positioned the crescent partition 136 in proper position. Thus the discharge port for the pump remains the same for both directions of rotation, and since the drive mechanism in the power leg is also operable for either direction of rotation of the input shaft, the power leg of the present invention can be used without modification for either a right or left hand screw.

Referring to the hydraulic cylinder unit 10 which extends between the mounting plate 16 and the upper housing 11, such has three functions, and namely, (1) to hold-down the power leg when in reverse drive, (2) to serve as a shock absorber when the power leg strikes an underwater obstruction during forward propulsion, and (3) to power lift the power leg about the pins 13—13 and hold it in elevated position. The housing 140 of the unit 10 has its closed end pivotally connected at 141 with an eye 142 formed at the front and lower end of the cross-web 21 while the piston 143 has its rod 144 pivotally connected by a detachable pin 145 to a rearwardly projecting ear 146 presented by the mounting plate 16 at a laterally centered position. For the hold-down function the cylinder 140 is charged through a hydraulic line 147 at the top to keep the assembly in the retracted position shown in FIG. 3 while for the shock absorber function this line 147 is vented so that the assembly is free to expand. Forced expansion of the unit 10 to swing the power leg upwardly about the pins 13—13 is accomplished by charging the lower end of the cylinder through a respective hydraulic line 148. The two lines 147–148 are preferably flexible hydraulic hoses and continue by extensions 147a–148a in the sump 23 to the control block 40 via through-fitting in the front wall 41 of the upper housing in similar manner to the extensions of the lines 110–111 from the hydraulic clutches 25–26. It will be noted that the lower part of the front wall 41 of the upper housing has a central depression 41b to give clearance for the cylinder 140 when the power leg is tilted up.

Figure 18:
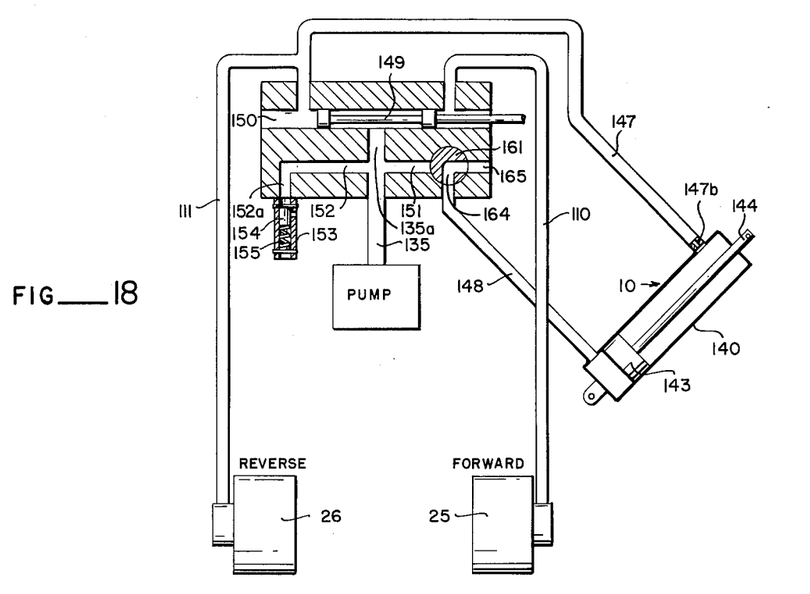
FIG. 18 is a schematic view of the hydraulic system for the outdrive unit.

Continuing to the control system for the clutches and the hydraulic cylinder shown schematically in FIG. 18, as has been previously indicated the control block 40 is connected by the lines 110–111 to the forward and reverse clutches and by the lines 147–148 to the upper and lower ends of the cylinder and is supplied with pressurized liquid by line 135 from the pump 24. In the detail drawings (FIGS. 7–10) of the control block the ports corresponding to these lines 110–111, 147–148 and 135 have been given the same identifying numerals.

Extending lengthwise of the control block 40 in the forward half thereof is a primary bore 150 for the three-way shuttle valve 149 which projects from the starboard end of the bore to present a crosshead 152. A crank pin 153 projecting rearwardly from a vertical crank plate 154 operates the crosshead responsive to starboard-port swinging of the crank plate on a forwardly extending shaft 155 which is journaled in a starboard continuation 40a of the block. The front face of this continuation is bored to receive a spring-loaded ball 156 for selectively cooperating with three detents 157 formed in the crank plate 154, and presents a stop pin 158 which projects into an enlarged opening 160 in the crank plate to limit the swing range thereof.

Both ends of the primary bore 150 in the control block vent directly to the sump 23, the left end being provided with an elbow fitting and vent tube 159 which depends far enough into the sump to insure that its lower end will always be submerged in the hydraulic fluid even when the power leg is tilted up. This insures that the upper end of the cylinder 10, which communicates with the bore 150 at the front of the control block, will always be free of air.

At the underside of the control block the primary bore 150 has a pair of axially spaced forward and reverse ports 110–111 for the clutches 25–26, the reverse port being coplanar with the port 147. Midway between these ports 110–111 the control block has a rearwardly opening feed passage 135a leading from the pump 24 and this passage is intersected by starboard and port branches 151–152. Of the latter, the port branch elbows downwardly at 152a to a depending relief valve comprising a cylinder 153, a slide valve 154, and a compression spring 155. The cylinder 153 fits into the mouth of the passage 152a and has a pair of vertically spaced cross-pins 156–157, the upper cross-pin serving as a stop for the upper end of the valve 154 and the lower cross-pin functioning as a seat for the lower end of the spring. Between the cross-pins 156–157 the cylinder 153 has a vent port 158 which is located to be exposed above the upper end of the valve 154 when a predetermined relief pressure is reached.

Figure 7:
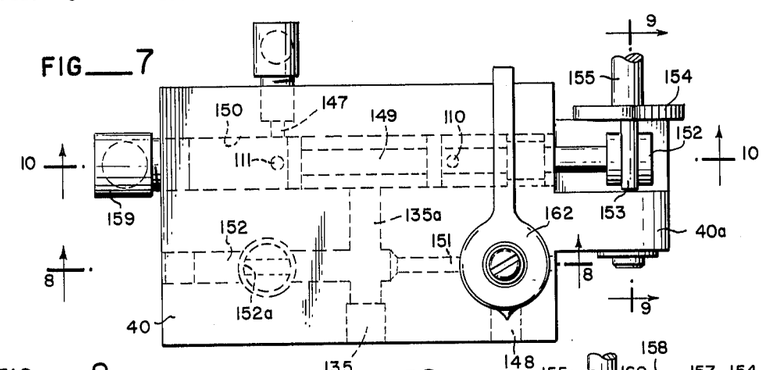
FIG. 7 is an enlarged top plan view of the shift control unit.
Figures 8, 9, 10:
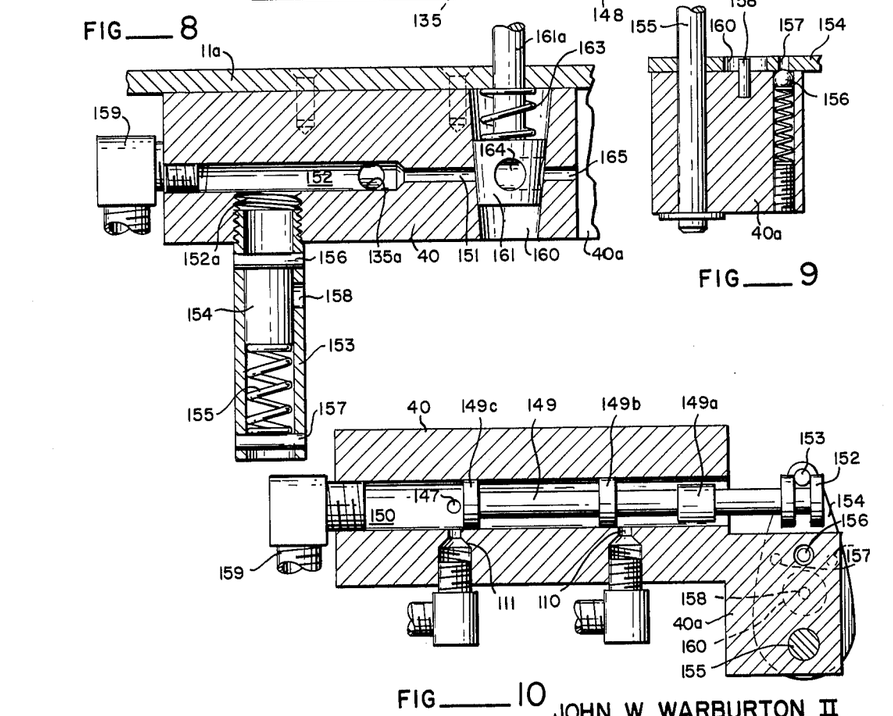
FIGS. 8, 9 and 10 are vertical sectional views taken as indicated by the lines 8—8, 9—9 and 10—10, respectively, of FIG. 7.

The starboard branch 151 is intersected by a tapered vertical bore 160 for a selector plug valve 161 whose stem 161a extends through the cover 11a of the upper housing to receive a pointer knob 162. A compression spring 163 on the stem 161a reacts against the cover to seat the valve 161. It will be noted that the selector valve has an angle bore 164 whose open ends are disposed a quarter turn apart circumferentially of the valve to selectively cross-connect a rearwardly opening port 148 for the lower end of the hydraulic cylinder 10 with the branch 151, or with a starboard dump port 165 alined with the branch 151 or to simultaneously plug the inner ends of the branch 151 and ports 148 and 165. When the pointer of the knob 162 is directed aft as shown in FIG. 7, which is its normal position, the port 148 is connected by the valve passage 164 with the dump port 165 thereby venting the lower end of the hydraulic cylinder unit 10. Then when the knob 162 is turned clockwise a quarter turn directing the pointer to port, the lower end of the unit 10 is charged with pressure fluid to expand the unit and lift the power leg by forcing the base of the cylinder 140 away from the piston 143. The power leg can then be locked in its elevated position by turning the knob 162 another quarter turn in the clockwise direction so that its pointer is aimed to the front of the power leg, the port 148 then being plugged by the valve 161. Preparatory to operating the selector valve 161 for hydraulically lifting the power leg, the shuttle valve 149 is placed at a neutral position with its control spools 149b–149c between the forward and reverse ports 110–111 so that the line 147 from the upper end of the hydraulic cylinder unit 10 is free to vent into the sump via the left end of the bore 150 and the related depending vent tube 159. The line 111 from the reverse clutch 26 vents in the same manner while the line 110 from the forward clutch 25 vents into the sump through the starboard end of the bore 150, the guide spool 149a on the starboard end of the shuttle valve 149 having a flat to permit fluid flow thereby. The shuttle valve 149 is in turn normally operated with the selector valve in its neutral position blocking the branch 151.

For forward drive the shuttle valve 149 is shifted to the starboard bringing the spool 149b to the right of the port 110 to charge the forward clutch 25 from the feed passage. While the shuttle valve 149 is in this forward drive position the reverse clutch 26 and the upper end of the cylinder 10 remain vented to the sump 23. At the same time the lower end of the cylinder 10 is vented to the sump through the line 148, selector valve passage 164, and the port 165.

If the power leg should strike an obstacle while in forward drive, it is free to swing rearwardly up out of the water with the hydraulic cylinder unit 10 then serving as a shock absorber since, as the unit expands responsive to kickup of the power leg, the fluid above the piston 143 will be forced into the sump 23 and fluid from the sump will be drawn into the cylinder 140 beneath the piston. As the power leg then swings back down after clearing the obstruction, the hydraulic unit 10 against serves as a shock absorber with the fluid below the piston returning to the sump and fluid from the sump being drawn into the upper end of the cylinder through line 147.

For reverse drive the shuttle valve is shifted to the left bringing the spool 149c to the left of the ports 111 and 137 to charge both the reverse clutch 26 and the upper end of the hydraulic cylinder unit 10. The latter then assumes its hold-down function, i.e. the power leg cannot kick up responsive to the reverse driving of the propeller. An orifice 147b in the line 147 assures that the hold-down fluid above the piston 143 will not bleed from the upper end of the cylinder 140 before the reverse clutch disengages responsive to a return of the shuttle valve to the right.

The shuttle valve 149 can be remotely controlled from the boat by an intermediate shaft 166 connected at 167 to the forward end of the shaft 155, a detachable coupling 168, and a shaft 170 having an operating lever 171 at its forward end which may be swung in any suitable manner by a flexible cable from a control station in the boat. It will be noted that the shaft 166, coupling 168 and shaft 170 substantially match parts 64, 65 and 66 respectively, and are parallel thereto. In this regard it is of particular importance to understand that the couplings 31, 65 and 168 all have the same general design and are arranged to have the same flexing axis as the swing axis 13—13 of the power leg.

Figures 1, 2:
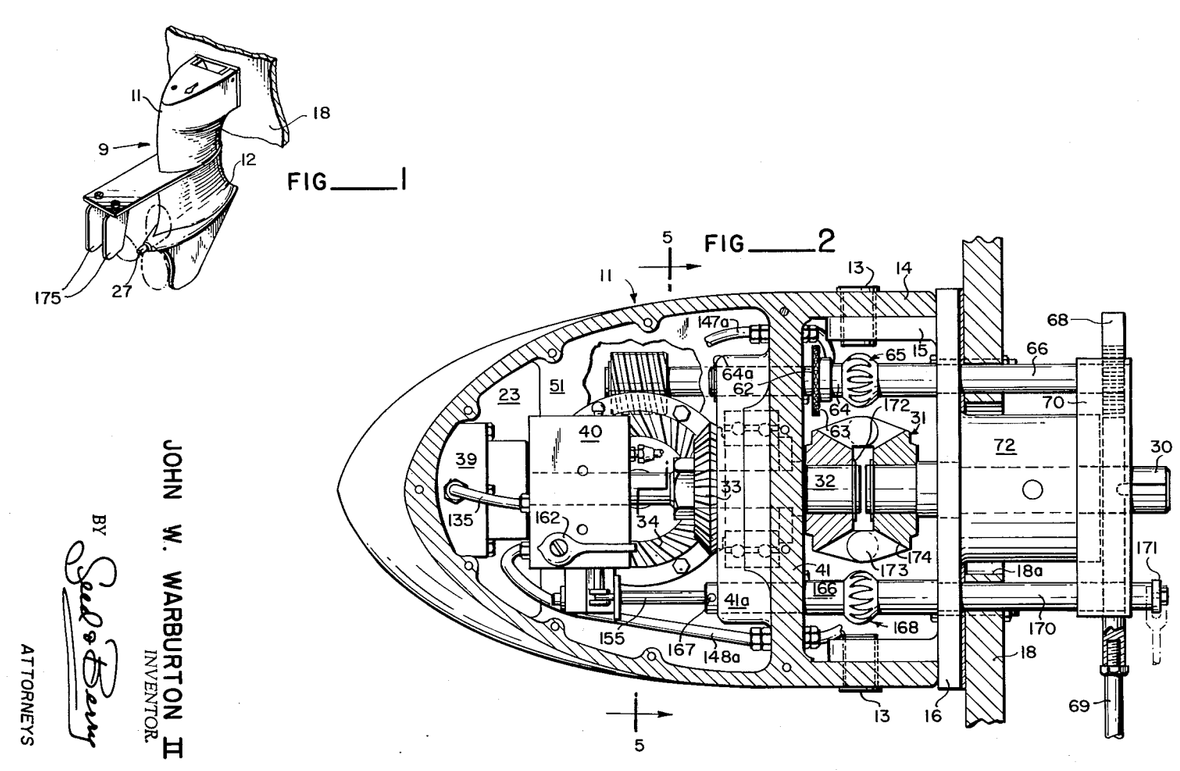
FIG. 1 is a perspective view of an outdrive unit embodying the present invention.
FIG. 2 is a horizontal sectional view taken as indicated by the line 2—2 of FIG. 3.
Figure 3:
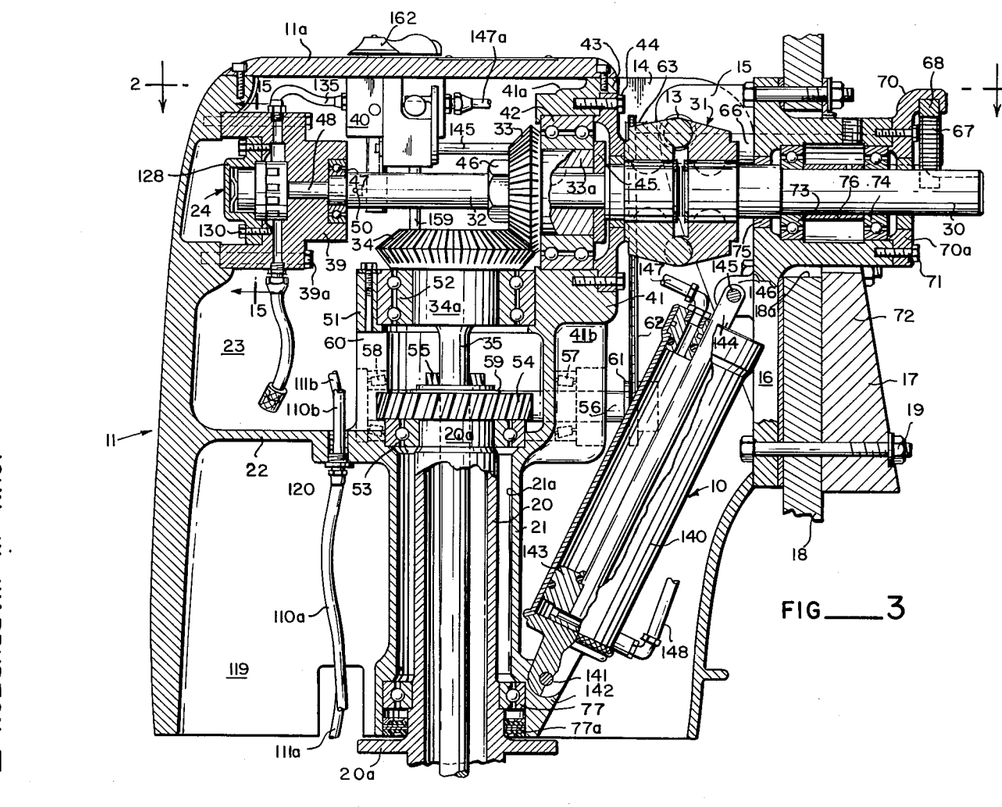
FIG. 3 is a longitudinal vertical sectional view of the upper part of the outdrive looking toward the port side.
Figures 5, 6:
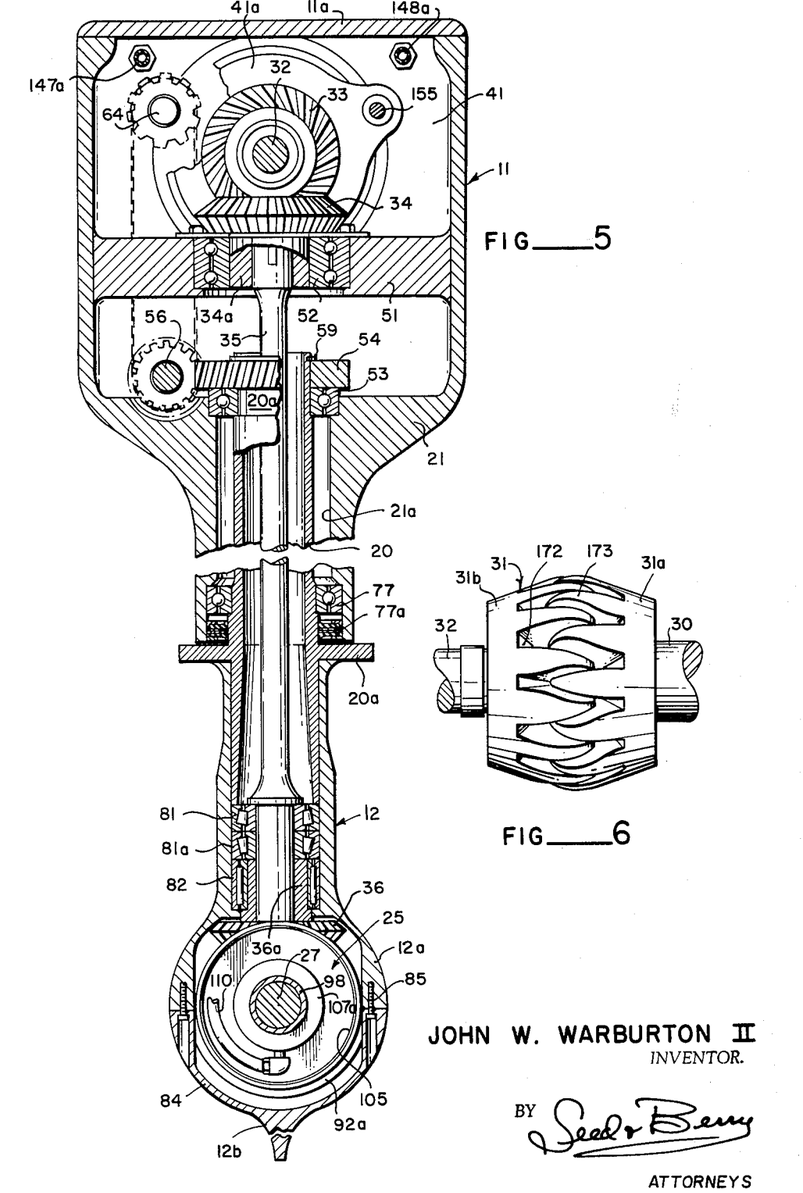
FIG. 5 is a transverse vertical sectional view taken along the line 5—5 of FIG. 2.
FIG. 6 is a top plan view of the flexible drive coupling directly to the stern of the transom.

Continuing to the design of the couplings, and referring to coupling 31 by way of example, shown in FIGS. 2 and 6, such comprises a pair of like intermeshing units 31a–31b having hubs keyed, respectively, to shafts 30 and 32, and retained thereon by snap ring 172. Each half of the coupling has a plurality of evenly spaced teeth 173 projecting endwise therefrom and diverging somewhat relative to the longitudinal axis of the coupling. The free ends of these teeth have a rounded taper and the portions 174 of the hub between the teeth are beveled for engagement by the tips of the teeth of the other half of the coupling. When the power leg is down in the normal drive position all of the teeth of the coupling are meshed in driving contact circumferentially speaking, and have their tips spaced endwise somewhat from the beveled end portions 174 of the opposing hub. At this time the swing axis defined by the pins 13—13 is midway between the units 31a–31b, but is spaced above the longitudinal axes thereof as indicated in FIG. 3 to coincide with the uppermost point of the pitch line of the coupling. Then, when the power leg tilts up about the pins 13 responsive to striking an obstruction or is hydraulically lifted by use of the cylinder 10, the upper teeth of the rear unit 31b swing forwardly toward those of the front unit 31a while the lower teeth of unit 31b swing rearwardly out of mesh. At the completion of a ninety degree upward swing of the power leg the uppermost teeth of each coupling half will still be fully in mesh with one another and the two teeth on either side will be partially meshed. The same is true of the intermeshing halves of the couplings 65 and 168. Thus when the forward clutch 23 is engaged, a drive connection is maintained from the engine to the propeller during the full range of the power leg tilt-up, and likewise a steering connection and shifting control connection are maintained from the boat to the power leg during the full range of tilt-up.

For ease of steering, there may be provided a pair of torque-countering vanes 175 which are set at an acute angle with the propeller axis so that the propeller wash against them exerts a force component transverse to the propeller axis in the direction creating a torque about the steering axis which is opposite to the propeller torque. These vanes are connected at their upper ends by studs 176 to the outer end of the cavitation plate 12d, so as to be suspended therefrom in parallel relation to one another.

To remove the power leg from the boat hull it is only necessary to pull the pins 13—13 about which the power leg swings, and pull the pin 145 at the outer end of the piston rod 144. The entire power leg including the hydraulic cylinder 10 and the rear halves of the flexible couplings 31, 65 and 168 can then be handled as a unit free of the hull.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language fairly admits.

What I claim is:

1. In a marine outdrive assembly, a power leg, means for swingably mounting said power leg outboard of a boat hull for tilt-up of the power leg about a tilt axis, a propulsion means mounted near the lower end of said power leg, drive means for said propulsion means including a drive input shaft to the power leg from the boat hull interrupted by a first flexible coupling means, shift means for selectively engaging and disengaging said propulsion means and including a turnable shift control shaft to said power leg from the boat hull interrupted by a second flexible coupling means, and steering means for steering said propulsion means relative to the boat hull including a steering control shaft from the boat hull to said power leg interrupted by a third flexible coupling means, said first, second and third flexible coupling means each having a flexing axis coinciding with said tilt axis.

2. The marine outdrive assembly of claim 1 in which said tilt axis is spaced above the rotary axis of said drive input shaft.

3. The marine outdrive assembly of claim 1 in which each of said three coupling means comprises a respective pair of meshing coupling members which are adapted to be separated from one another solely by bodily movement of said power leg away from the boat hull after the power leg has been otherwise disconnected relative to the boat hull.

4. The marine outdrive assembly of claim 1 in which each of said three coupling means comprises a respective pair of coupling members comprising a pair of spaced hubs having opposed intermeshing teeth projecting longitudinally of the hubs and evenly spaced circumferentially thereof, the free ends of said teeth being rounded and the portions of the hubs between the teeth being beveled inwardly toward the opposed free ends of the hubs whereby the axes of said hubs can be inclined relative to one another at a constant flexing axis coinciding with said tilt axis responsive to tilt-up of the power leg without interrupting drive between said hubs via the upper teeth.

5. In a marine outdrive assembly, a power leg, means for swinging said power leg outboard of a boat hull for tilt-up of the power leg about a tilt axis propulsion means mounted in said power leg, drive means for said propulsion means including an input shaft to said power leg having its rotary axis spaced below said tilt axis, shift means for selectively engaging and disengaging said propulsion means and including a shift control shaft to said power leg, and respective flexible coupling means for said drive input shaft and said shift control shaft, each said coupling means having a flexing axis coinciding with said tilt axis.

6. The marine outdrive assembly of claim 5 in which said shift means comprises forward and reverse hydraulic clutches, and a hydraulic system for said clutches controlled by said shift control means.

7. In a marine outdrive assembly, a power leg having an upper housing and a steerable lower housing, means for swingably mounting said upper housing outboard of a boat hull for tilt-up of the power leg about a horizontal tilt axis, propulsion means carried by said lower housing, drive means for said propulsion means including a drive input shaft to said upper housing interrupted by a first flexible coupling means, and steering means for said lower housing including a rotary steering control shaft to said power leg interrupted intermediate its ends by a second flexible coupling means, said first and second flexible coupling means each having a flexing axis coinciding with said tilt axis.

8. In a marine outdrive assembly, a power leg, means for swinging said power leg outboard of a boat hull for tilt-up of the power leg about a horizontal tilt axis, a propeller journal-mounted in said power leg, means for steering said propeller about a generally vertical axis and including a steering control shaft to said power leg interrupted by a first flexible coupling means, drive means for said propeller, shift means for selectively engaging and disengaging said propeller and including a shift control shaft to said power leg interrupted by a second flexible coupling means, said first and second flexible coupling means each having a flexing axis coinciding with said tilt axis.

9. In a marine outdrive assembly, a power leg having an upper housing and a steerable lower propeller housing, means for swingably mounting said upper housing outboard of a boat hull for tilt-up of the power leg about a horizontal tilt axis, a propeller shaft journal-mounted in said propeller housing, drive means for said propeller shaft including a drive input shaft to said upper housing interrupted by a first flexible coupling means and including a clutch in said power leg, shift control means for selectively engaging and disengaging said clutch and including a shift control shaft to said power leg interrupted by a second flexible coupling means, and steering means for said propeller housing including a steering control shaft to said power leg interrupted by a third flexible coupling means, said first, second and third flexible coupling means each having a flexing axis coinciding with said tilt axis.

10. In a marine outdrive assembly, a power leg having a non-steerable upper housing and a steerable lower housing with an upright steering tube projecting into said upper housing and journaled therein, means for swingably mounting said upper housing outboard of a boat hull for tilt-up about a generally horizontal tilt axis, propulsion means carried by said lower housing, drive means for said propulsion means passing from said upper housing into said lower housing through said steering tube and including a drive input shaft to said upper housing from the boat hull interrupted by a first flexible coupling means, a worm gear in said upper housing on said steering tube, a worm meshing with said worm gear in parallel relation to said drive input shaft, and steering control means for selectively turning said worm including a rotary steering control shaft from the boat hull to said upper housing spaced above the level of said worm and interrupted intermediate its ends by a second flexible coupling means, said first and second flexible coupling means having respective flexing axes coinciding with said tilt axis.

11. In a marine outdrive assembly, a power leg, a mounting plate for a boat transom, means for swingably mounting said power leg on said mounting plate for tilt-up of the power leg about a generally horizontal starboard-port tilt axis, a propeller shaft journal-mounted near the lower end of said power leg, drive means for said propeller shaft including forward and reverse clutches in the power leg and a drive input shaft to the power leg extending through said mounting plate and interrupted by a first flexible coupling means located between said mounting plate and power leg, shift control means for selectively engaging and disengaging said clutches and including a shift control shaft to the power leg extending through said mounting plate and interrupted by a second flexible coupling means located beside said first flexible coupling means, and steering means for steering said propeller shaft relative to said mounting plate including steering control shaft extending through said mounting plate to the power leg and interrupted by a third flexible coupling means located beside said first flexible coupling means, said first, second and third flexible coupling means each having a flexing axis coinciding with said tilt axis.

12. The marine outdrive assembly of claim 11 in which said second and third flexible coupling means are located on opposite sides of said first flexible coupling means.

13. The marine outdrive assembly of claim 11 in which shock absorber means extend between said mounting plate and said power leg.

14. The marine outdrive assembly of claim 11 in which said mounting plate has a forwardly projecting boss for extending through the boat transom and providing a journal for said drive input shaft, a pinion mounted on said steering control shaft forwardly of the mounting plate, and a slide rack carried by said boss and meshing with said pinion.

References Cited by the Examiner

UNITED STATES PATENTS

| | | | |
|---|---|---|---|
| 2,458,813 | 1/1949 | Wanzer | 115—35 |
| 2,542,682 | 2/1951 | Kloss | 192—48 |
| 2,669,971 | 2/1954 | Mooney | 92—107 |
| 2,755,766 | 7/1956 | Wanzer | 115—35 |
| 2,999,476 | 9/1961 | Johnson | 115—35 |
| 3,006,311 | 10/1961 | Hansson et al. | 115—35 |
| 3,139,062 | 6/1964 | Keefe | 115—34 |
| 3,166,040 | 1/1965 | Armantrout et al. | 115—41 |

MILTON BUCHLER, *Primary Examiner.*

FERGUS S. MIDDLETON, *Examiner.*

R. G. BESHA, T. MAJOR, *Assistant Examiners.*